US007623514B2

(12) United States Patent
Ozawa et al.

(10) Patent No.: US 7,623,514 B2
(45) Date of Patent: Nov. 24, 2009

(54) DATA TRANSMISSION DEVICE CAPABLE OF TRANSMITTING DATA TO A PLURALITY OF ADDRESSES BY SIMPLE METHOD

(75) Inventors: Kaitaku Ozawa, Amagasaki (JP);
Kenichi Takahashi, Sennan-gun (JP);
Toshiya Shozaki, Osaka (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 840 days.

(21) Appl. No.: 11/178,338

(22) Filed: Jul. 12, 2005

(65) Prior Publication Data

US 2006/0221957 A1    Oct. 5, 2006

(30) Foreign Application Priority Data

Apr. 4, 2005    (JP) ............................... 2005-107524

(51) Int. Cl.
*H04L 12/28* (2006.01)
(52) U.S. Cl. ..................... 370/389; 370/432; 711/202
(58) Field of Classification Search .................. None
See application file for complete search history.

(56) References Cited

U.S. PATENT DOCUMENTS

| 6,330,080 | B1 | 12/2001 | Omori |
| 6,614,551 | B1 | 9/2003 | Peek |
| 6,825,955 | B1 | 11/2004 | Shibata |
| 2003/0131361 | A1* | 7/2003 | Yamamoto et al. .......... 725/131 |

FOREIGN PATENT DOCUMENTS

| JP | 9-294198 A | 11/1997 |
| JP | 2001-077997 | 3/2001 |
| JP | 2002-232639 | 8/2002 |
| JP | 2002-300212 A | 10/2002 |
| JP | 2005-142622 A | 6/2005 |

OTHER PUBLICATIONS

Japanese Office Action (with English language translation) dated Jul. 03, 2007.

* cited by examiner

*Primary Examiner*—Bob A Phunkulh
(74) *Attorney, Agent, or Firm*—Buchanan Ingersoll & Rooney PC

(57) ABSTRACT

When an MFP determines that text data is transmitted to a plurality of addresses as destinations set by a user, an address group including set addresses is searched from a one-touch key registration and the transmission history of the user (or a group such as a department or a section associated with the user). Thus, the addresses input earlier and the address groups including the addresses yet to be input are displayed as destination candidates. The user selects a desired address group from those displayed, and thus can designate the data transmission to a plurality of addresses constituting the particular address group.

20 Claims, 14 Drawing Sheets

FIG.5

TRANSMISSION HISTORY LIST

| No | USER | DOCUMENT | ADDRESS | LEADING PAGE | ATTRIBUTE | RESULT | DATE AND HOUR |
|---|---|---|---|---|---|---|---|
| 001 | ozawa | pat.jp | abcd@efg.co.jp,hij | /rec/20050215/a | DRAWING | NORMAL TRANSMISSION | 2005.02.15 |
| 002 | ozawa | image.jp | dc@efg.co.jp,hij@e | - | - | DELETE ERROR | 2005.02.21 |
| 003 | ozawa | PATENT.pdf | a@co.jp,abcd@efg. | /rec/20050221/d | TEXT | NORMAL TRANSMISSION | 2005.02.22 |

DETAIL

DATA TRANSMISSION DEVICE CAPABLE OF TRANSMITTING DATA TO A PLURALITY OF ADDRESSES BY SIMPLE METHOD

This application is based on Japanese Patent Application No. 2005-107524 filed with the Japan Patent Office on Apr. 4, 2005, the entire content of which is hereby incorporated by reference.

BACKGROUND OF THE INVENTION

1. Field of the Invention

The present invention relates to a data transmission device and an address setting auxiliary program product. In particular, the present invention relates to a data transmission device for transmitting data to a plurality of addresses, and a recording medium for recording an address setting auxiliary program product.

2. Description of the Related Art

Generally, an address is input on various occasions to transmit transmission data, and the work of setting the address is a burden on a user in every case. Also, a setting error due to an erroneous input of an address often occurs. To cope with this problem, a data transmission device for reducing the burden on the user for the setting work by acquiring setting items required for data transmission by reference to a transmission history has been proposed by, for example, Japanese Laid-Open Patent Publication No. 2002-232639.

Also, a facsimile device for acquiring information on items set by a user with reference to a transmission history has been proposed by Japanese Laid-Open Patent Publication No. 2001-77997 in which the information on the other party corresponding to his/her telephone number is acquired from the transmission history and displayed when the telephone number is manually input thereby to prevent an input error of the telephone number of the other party.

In these conventional data transmission devices, however, a setting error can be prevented in the case where a single address is set, by reducing the various setting jobs other than for setting the particular address or displaying the information corresponding to the set address. It is still necessary, however, for the user to set the address. In the case where a plurality of addresses are set at the time of data transmission, therefore, each address is required to be set by the user, thereby posing the problem that an operation error such as a setting error, a setting failure or an extraneous setting is liable to occur.

Also, in the conventional data transmission device, the operation of setting a plurality of addresses imposes a heavy work load on the user. As a solution to the problem in which a plurality of addresses are required to be set by the user each time of data transmission, a method is widely known in which a plurality of addresses are set with a one-touch key in advance and the addresses are set at one touch at the actual time of transmission. This method, however, is accompanied by a new work load to set a plurality of addresses with one-touch key in advance on the one hand, and requires the key selection by determining a key and a corresponding address on the other hand. Especially in the case where a single one-touch key corresponds to a plurality of addresses, it is not easy to identify the address corresponding to a given key, thereby often causing a selection error.

SUMMARY OF THE INVENTION

Accordingly, it is an object of the present invention to provide a data transmission device and an address setting auxiliary program product capable of setting a plurality of addresses by a simple address setting method while reducing a work load on a user and preventing an operation error at the time of data transmission.

In order to achieve this object, according to one aspect of the present invention, there is provided a data transmission device that includes: an address input unit to input a destination of transmission data as an address; an address determining unit to determine whether a plurality of addresses are input as the destinations by the address input unit; an address search unit to search, upon determination by the address determining unit that a plurality of addresses are input as the destinations by the address input unit, a transmission history including the destinations input by the address input unit and acquire an address group including the addresses as destinations; and a proposition unit to propose the address group acquired by the address search unit.

According to another aspect of the present invention, there is provided an address setting auxiliary program product for a computer to execute a process of assisting in setting an address of transmission data, which includes the steps of: inputting an address as a destination of the transmission data; determining whether a plurality of addresses are input as the destinations in the address inputting step; searching, upon determination in the address determining step that a plurality of addresses are input as the destinations in the address inputting step, the transmission history including the destinations input in the address inputting step and acquiring an address group including the addresses as destinations; and proposing the address group acquired in the address searching step.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 5 is a diagram showing a specific example of a transmission history stored in a transmission history storage 204.

DESCRIPTION OF THE PREFERRED EMBODIMENTS

Figure 1:
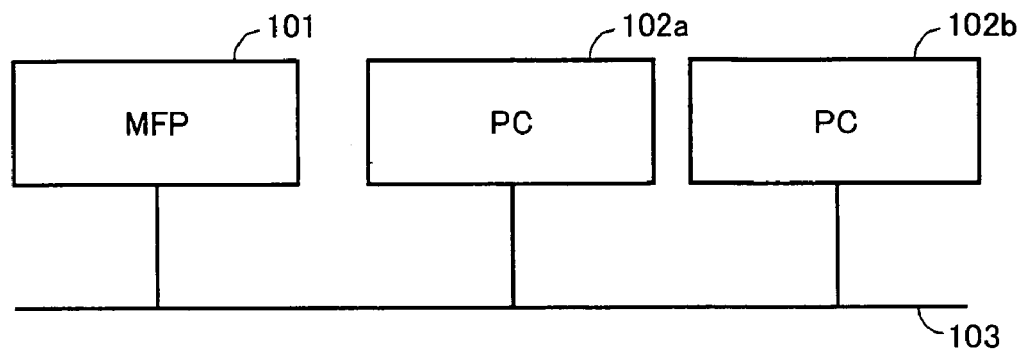
FIG. 1 is a diagram showing a specific example of a configuration of a network system according to an embodiment of the present invention.

Preferred embodiments of the present invention will be described below with reference to the drawings. In the following description, the same parts and constituent elements having the same names and the same functions are designated by the same reference numerals, respectively.

Referring to FIG. 1, a network system according to this embodiment includes MFP (Multi Function Peripherals) 101, as an example of the data transmission device, connected to terminal units 102a, 102b such as PCs (Personal Computers) (hereinafter referred to collectively as a PC 102) by a network 103.

The network system according to this embodiment is assumed to handle text data specifically. A user logs in to MFP 101 and thus can transmit text data in MFP 101 to PC 102.

Figure 2:
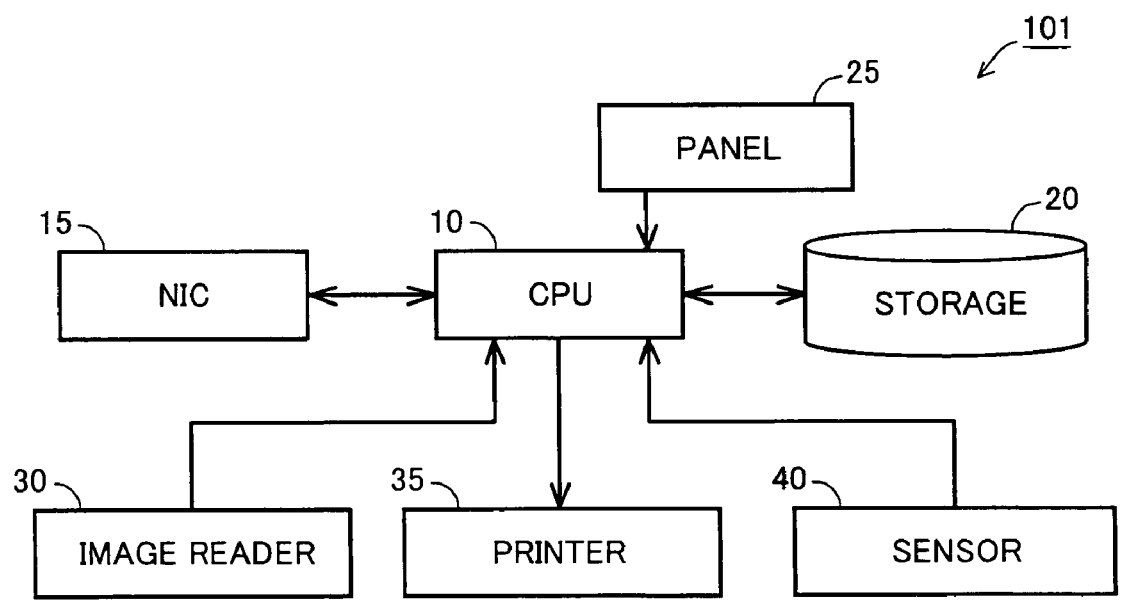
FIG. 2 is a block diagram showing a specific example of a hardware configuration of an MFP 101.

Referring to FIG. 2, MFP 101 is configured of a CPU (Central Processing Unit) 10 to control the whole device, an image reader 30 to read image data from an original, a printer 35 to print an image on a sheet, an NIC (Network Interface Card) 15 providing an extension card inserted in an extension slot (not shown) to connect MFP 101 to network 103 or a telephone line or to conduct a short-distance radio communication, and an HD (Hard Disc). MFP 101 further includes a storage 20 to store job data and a program to be executed by CPU 10, a panel 25 providing an interface with the user, and a sensor 40 to detect the supplies remaining to be consumed.

Figure 3:
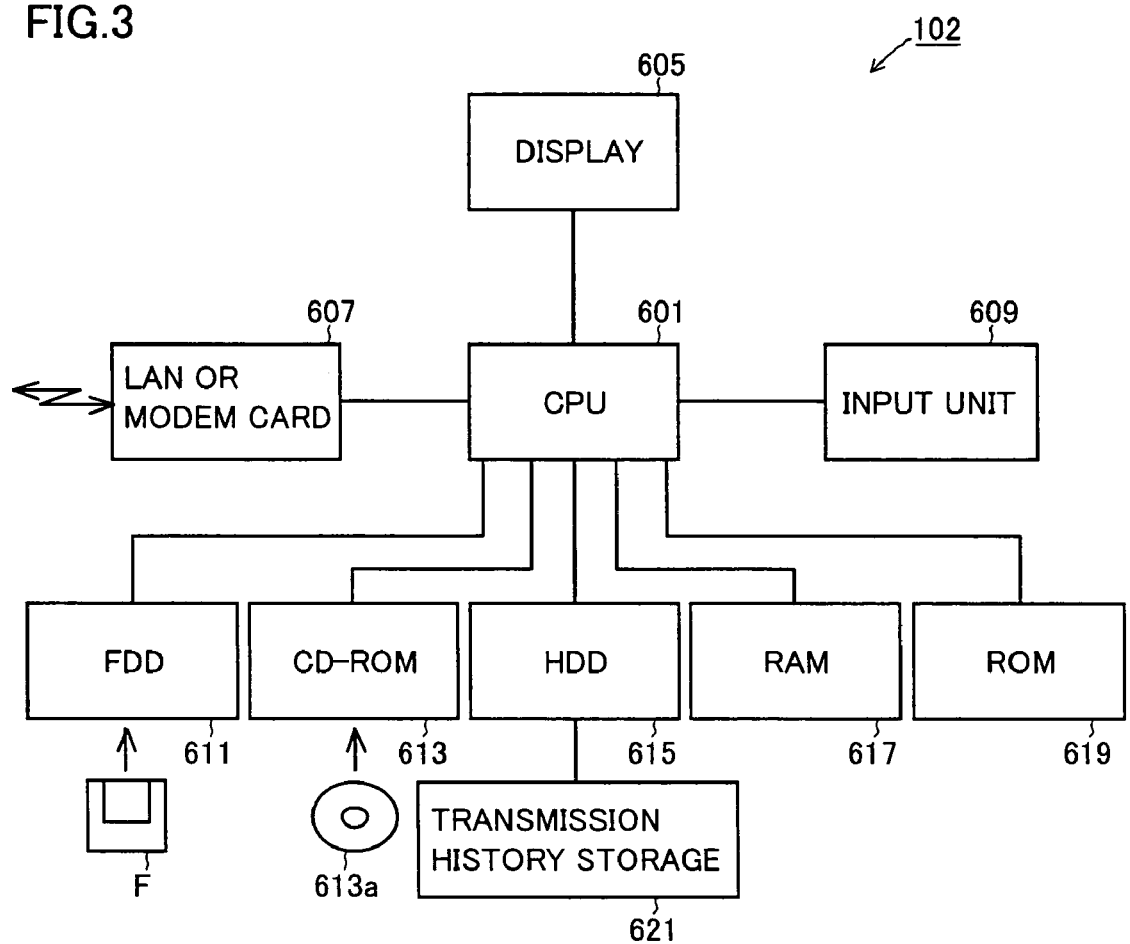
FIG. 3 is a block diagram showing a specific example of a hardware configuration of a PC 102.

Referring to FIG. 3, PC 102 includes a CPU 601 to control the whole device, a display 605, a LAN (Local Area Network) card 607 (or a modem card) to connect to network 103 or conduct communication with an external device, an input unit 609 made up of a keyboard, a mouse, etc., a flexible disk drive (FDD) 611, a CD-ROM (Compact Disc-Read Only Memory) drive 613, a hard disc drive (HDD) 615, a RAM (Random Access Memory) 617 and a ROM (Read Only Memory) 619.

The data such as a program recorded in flexible disc F can be read by flexible disc drive 611, and the data such as a program recorded in CD-ROM 613a can be read by CD-ROM drive 613.

Further, hard disc drive 615 includes a transmission history storage 621 (or a transmission history storage 621 related to hard disc drive 615 exists) to store a transmission history described later.

Figure 4:
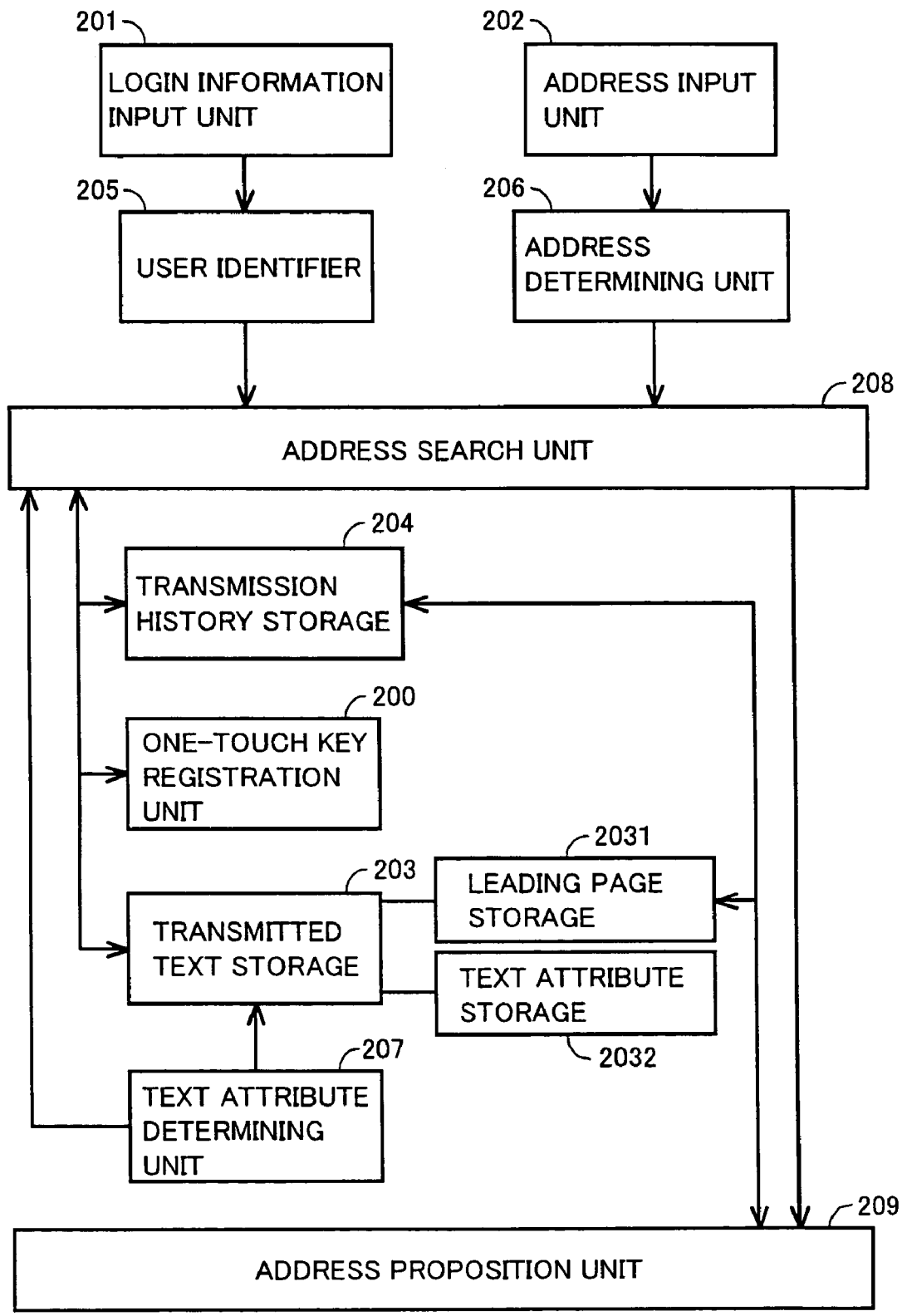
FIG. 4 is a block diagram showing a functional configuration of MFP 101.

Each function shown in FIG. 4 is to realize the function to assist in the operation of setting the address to which the user transmits data from MFP 101. This function is performed by reading and executing the program stored in storage 20 by CPU 10 shown in FIG. 2.

Referring to FIG. 4, MFP 101 includes a login information input unit 201 to input login information of the user, a user identifier 205 to identify the user that has logged in, an address input unit 202 to input the address of a destination of the text data, an address determining unit 206 to determine whether a plurality of addresses are set by the user, a transmission history storage 204 to accumulate the data such as the transmission history of each user and the address book in a predetermined area of the storage 20, a one-touch key registration unit 200 to store a group of addresses corresponding to the one-touch key for setting at least one address with a single key operation in a predetermined area of storage 20, a transmitted text storage 203 to store the transmitted text data in a predetermined area of storage 20, a text attribute determining unit 207 to determine the attribute of the text data, an address search unit 208 to search an address group containing a set address, and an address proposition unit 209 to propose a retrieved address to the user. Further, transmitted text storage 203 includes a leading page storage 2031 and a text attribute storage 2032. Alternatively, leading page storage 2031 and text attribute storage 2032 exist as related to transmitted text storage 203.

Login information input unit 201, based on the login operation of the user on a panel 25 or PC 102 through network 103, inputs the login information to user identifier 205. Specific examples of the login information include information specifying the user as an individual (ID, password, finger prints or the like biological information), and information (ID, password, etc.) specifying a group (department, section, etc.) to which the user belongs.

User identifier 205 identifies the user based on the login information input from login information input unit 201. Specifically, the unique identification information capable of identifying the user is extracted (or converted) by MFP 101 from the login information input from login information input unit 201, or with reference to a correspondence table (not shown), the identification information corresponding to the login information is acquired. These processes may include an authentication process as to whether the user is authorized to use MFP 101. The user identification information thus logged in is input to address search unit 208.

Address input unit 202 inputs the information indicating an address to address determining unit 206 based on the address setting operation of the user performed in panel 25 or PC 102 through network 103.

Address determining unit 206, based on the information indicating the address input from address input unit 202, determines whether a plurality of addresses are set, and upon determination that a plurality of addresses are set, inputs an address search request signal together with the information indicating the address to address search unit 208.

Text attribute determining unit 207 determines the attribute of the text data transmitted, as required, and inputs the information indicating the attribute to address search unit 208. Also, text attribute determining unit 207 determines the attribute of the text data transmitted, and inputs the information indicating the attribute to transmitted text storage 203. The attribute determined herein includes the file name, the data type, the data size, the version information, the information on the creator and the administrator, the information on the creation, the information on the access administration attached to the text data and the data obtained by analyzing the text data.

One-touch key registration unit 200 stores one or a plurality of addresses corresponding to each of one-touch keys (one-touch key 1, one-touch key 2, and so on). Alternatively, one or a plurality of addresses corresponding to each user who has logged in may be stored in each one-touch key. In such a case, one-touch key registration unit 200 stores one or a plurality of addresses corresponding to each one-touch key and the user identification information for the particular one-touch key.

Transmitted text storage 203 stores the text data transmitted by MFP 101. Also, the text data read by an image reader 30, whether transmitted or not transmitted, may be stored. Also, the text data transmitted from other devices such as PC 102 through NIC 15 may be stored. Further, without regard to the transmission result (normal transmission, erroneous transmission, etc.), the text data to designated for transmission may be stored.

Furthermore, the text data stored in transmitted text storage 203 which corresponds to the leading page of a text is stored in a leading page storage 2031, and the information indicating the attribute of the transmitted text data input from text attribute determining unit 207 is stored in text attribute storage 2032.

Address search unit 208, in response to the address search request signal input from address determining unit 206, searches one-touch key registration unit 200, transmission history storage 204 and, as required, text attribute storage 2032 and extracts at least one address group candidate including one or a plurality of addresses based on the identification information of the user (or the identification information of the group associated with the user) who has logged in, input from user identifier 205, the information indicating the address input from address determining unit 206 and, as required, the information indicating the attribute of the transmitted text data input from text attribute determining unit 207. The information on the address group candidate thus extracted is input to address proposition unit 209.

Address proposition unit 209, based on the information on the address group candidate input from address search unit 208, causes panel 25 or display 605 of PC 102 through NIC 15 to execute the process in which the address group candidates to be proposed to the user are displayed selectably in a predetermined order. In the process, address proposition unit 209, as required, referring to transmission history storage 204, acquires, for use in the particular process, the text data stored in leading page storage 2031. This process may be executed in response to a designation signal based on the designation operation performed by the user on panel 25 or PC 102 through network 103.

FIG. 5 is a diagram showing a specific example of the transmission history stored in MFP 101 and also stored in transmission history storage 204 shown in FIG. 4.

Referring to FIG. 5, the transmission history stored specifically include, as information corresponding to each other, the identification information (user name, etc.) of the user or a predetermined group transmitting the text data, the attribute (drawing, text, etc.) or the information (data name, etc.) of the data specifying the particular text data, one or a plurality of addresses to which the particular text data is transmitted, the place in leading page storage 2031 where the text data corresponding to the leading page of the text thereof is saved, and the information on the transmission time (transmission date and hour). Further, in the case shown in FIG. 5, the text data designated for transmission is stored in transmission history storage 204 regardless of the transmission result (normal transmission, erroneous transmission, etc.), in which case the transmission result (normal transmission, erroneous transmission, etc.) is also stored as corresponding information.

In the case where the operation of designating the transmission of the text data is performed by PC 102 through network 103 and the text data is transmitted by MFP 101, the transmission history shown in FIG. 5 is stored in transmission history storage 621 of PC 102. Alternatively, the transmission history may be stored in both transmission history storage 204 of MFP 101 and transmission history storage 621 of PC 102.

Figure 6:
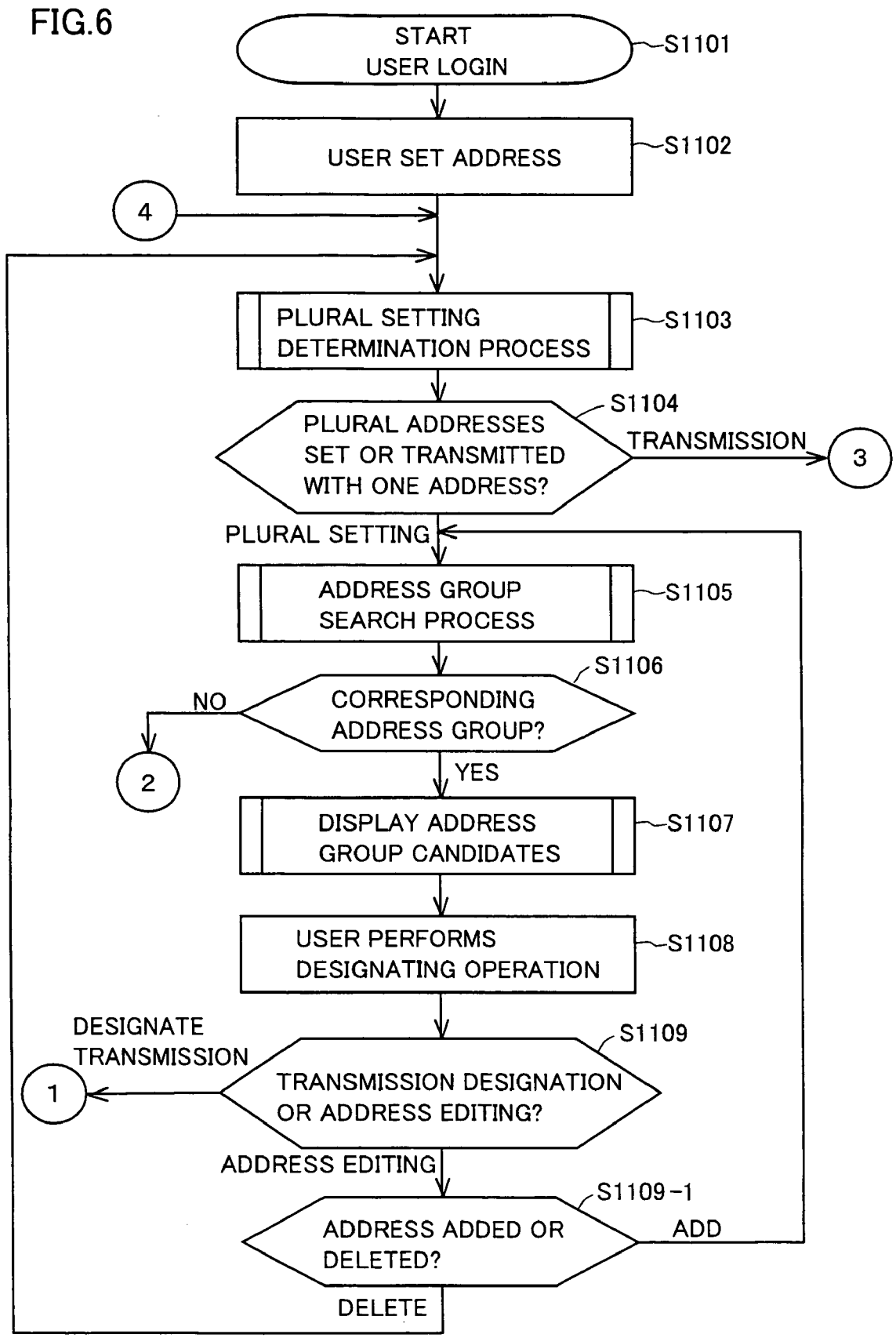
FIGS. 6 and 7 are a flowchart showing a text data transmission process including an address setting auxiliary process by MFP 101 according to an embodiment.
Figure 7:
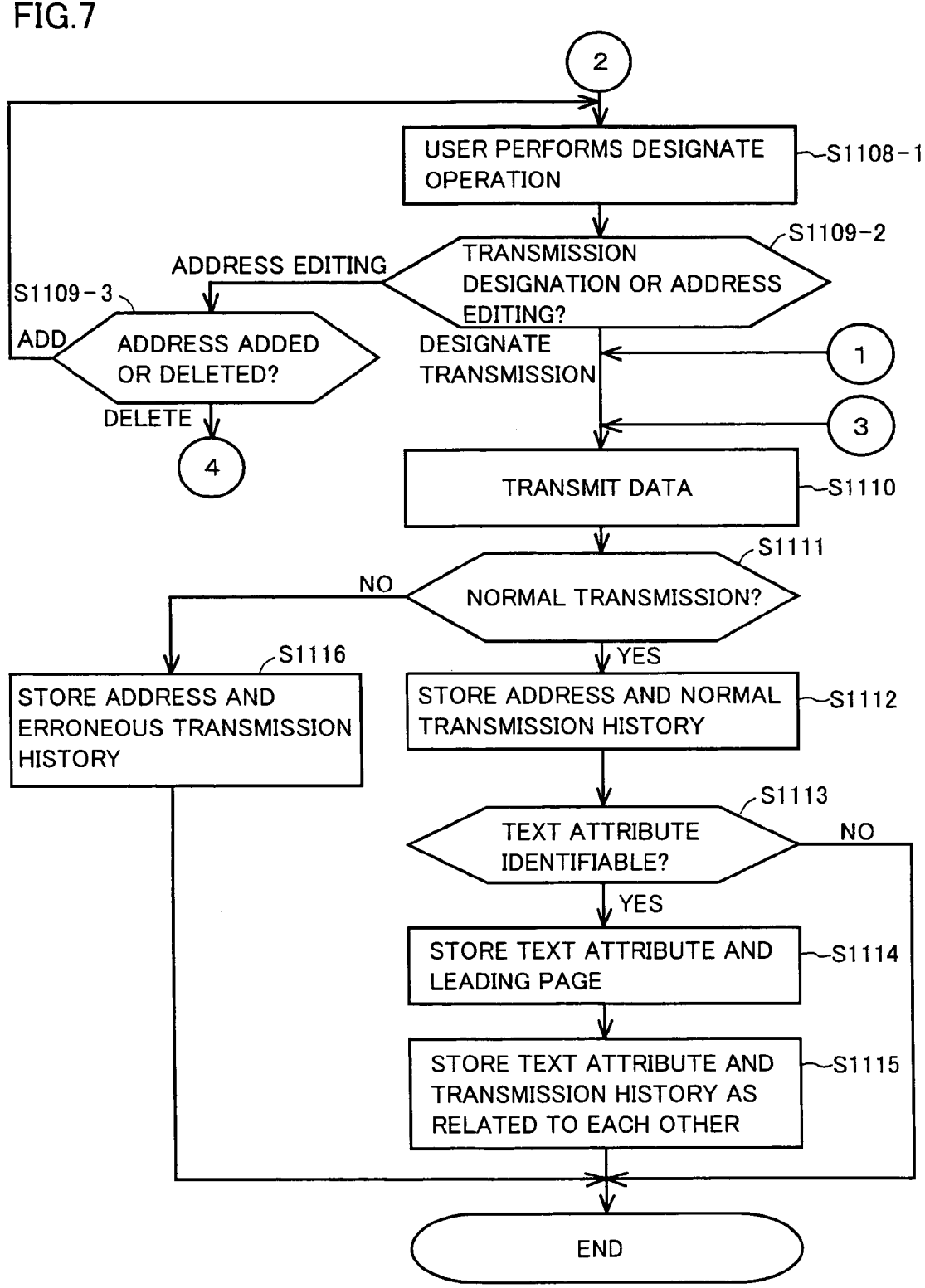

The process shown in the flowchart of FIGS. 6 and 7 is executed by CPU 10 shown in FIG. 2 reading and executing the program stored in storage 20 and thus performing the functions of each component shown in FIG. 4.

Referring to FIG. 6, this process is started by the login operation of the user from panel 25 shown in FIG. 2 or PC 102 through NIC 15 (step S1101).

Then, the user sets an address to transmit the text data from MFP 101 on panel 25 shown in FIG. 2 or PC 102 through NIC 15. Address input unit 202 shown in FIG. 4 receives the address thus input (step S1102).

Address determining unit 206, based on the information indicating the address input by address input unit 202 in step S1102, determines whether a plurality of addresses are input (step S1103). The fact that a plurality of addresses are input is determined in the case where a second address is input after a first address (the second address is completely input) (method 1), in the case where the first character of the second address is input after the first address (method 2) or in the case where a comma defining the first and second addresses is input after the first address (method 3). A particular method employed by address determining unit 206 and a particular time point at which address determining unit 206 determines that a plurality of addresses are included can be set by the user arbitrarily. The process of step S1103 (plural setting determination process) to determine whether a plurality of addresses are set will be described later.

In the case where the result of the process in step S1103 shows that only one address is set in step S1102, i.e., in the case where the user performs the operation to designate the transmission of the text data after setting the first address ("transmission" in step S1104), the process of steps S1105 to S1110 is skipped, and the text data designated is transmitted to the first address (step S1110).

In the case where the result of the process in step S1103 shows that a plurality of addresses are set in step S1102 ("plural setting" in step S1104), on the other hand, address search unit 208 searches the address group including a plurality of set addresses (step S1105).

In the case where the search range is the transmission history as shown in FIG. 5, the search in step S1105 may be conducted while reducing the search range to the history of normal transmission result. Alternatively, the attribute of the transmitted text data determined by text attribute determining unit 207 is compared with the attribute of the text data included in the transmission history, and the history having a greater similarity of the attribute may be searched. In transmitting the text data Ver. 2 of a given text, for example, the transmission history can be narrowed to that of the text data Ver. 1 of the particular text. As another alternative, in the case where the omission of an address to which a given text data is to be transmitted is discovered after transmission to a given address group and the text data is transmitted to the omitted address additionally, then the transmission history including the particular address group with the omitted address included therein is preferably searched. As still another alternative, the transmission history constituting the search range may be the transmission history stored in transmission history storage 204 of MFP 101 and/or the transmission history stored in transmission history storage 621 of PC 102.

The search process in step S1105 will be described later.

In the case where an address group including a plurality of set addresses is extracted as the result of the process in step S1105 (YES in step S1106), address proposition unit 209 executes the process to display the address group candidate extracted in step S1105 on panel 25 or display 605 of PC 102 through NIC 15 (step S1107).

Under this condition, the user designation of the operation to set another address from the address book, etc. and the operation to select and designate the transmission of the address group candidate displayed on panel 25 or display 605 of PC 102 is received from panel 25 or PC 102 through NIC 15 (step S1108).

In the case where the operation designated in step S1108 is the operation to edit an address ("address editing" in step S1109), the operation to set and add an address further, or the operation to select the desired address group from the address group candidates displayed on panel 25 or display 605 of PC 102 and add an address to the particular address group ("add" in steps S1109-1), then the process is returned to step S1105 and repeated to search the address group including a plurality of addresses set from step S1105 (steps S1105 to S1107).

In step S1109-1, address determining unit 206 determines whether an address is added by a similar method (methods 1 to 3 or the like) in step S1103 to determine whether a plurality of addresses are involved. Specifically, in the case where the next address is input to the addresses set in step S1102 displayed on panel 25 or display 605 of PC 102 or to the desired address group selected from the address groups displayed in step S1107, or in the case where a comma is input following the next address or otherwise the operation showing the intention of adding an address is performed by the user, then address determining unit 206 determines in step S1109 that an address has been added.

In the case where the designation in step S1108 is the address edit operation ("address editing" in step S1109) to delete the set address ("delete" in step S1109-1), the process is returned to step S1103 and the process from step S1103 is repeated.

In the case where the designation in step S1108 is the operation to select the desired address group from the address group candidates displayed on panel 25 or display 605 of PC 102 and designate transmission of the text data to the particular address group ("designate transmission" in step S1109), CPU 10, referring to FIG. 7, executes the process to transmit the intended text data through NIC 15 to each address included in the address group selected (step S1110).

In the case where the address group including a plurality of set addresses fails to be extracted as the result of the process in step S1105 (NO in step S1106), like in step S1108, the user designating operation is received (step S1108-1). In the case where the designation in step S1108 is the operation to designate transmission of the text data ("designate transmission" in step S1109-2), CPU 10 executes the process to transmit the intended text data to each address set (step S1110). Assume, on the other hand, that the designation is the operation to edit an address ("address editing" in step S1109-2) to set and add an address ("add" in step S1109-3). In view of the fact that the address group including a plurality of addresses set before the addition is not extracted in step S1105, the address group search process in step S1105 is not repeated. Instead, the added address is set as it is and another user designation is received (step S1108-1).

Also, assume that the designation in step S1108-1 is the operation to edit an address ("address editing" in step S1109-2) to delete a set address ("delete" in step S1109-3). In view of the fact that the address group including other than the deleted address is liable to be extracted, the process is returned to step S1103 to repeat the process from step S1103.

Upon transmission of the text data in step S1110, CPU 10 determines whether the transmission is normal one or not (step S1111).

Upon determination in step S1111 that the transmission is an erroneous transmission (NO in step S1111), the determination result (erroneous transmission) is stored, together with the address, in transmission history storage 621 (step S1116) thereby to end the series of processes.

Upon determination in step S1111 that the transmission is normal one (YES in step S1111), on the other hand, the result of determination (normal transmission), together with the address, is also stored in transmission history storage 621 (step S1112). In the case where the transmission is designated from PC 102 in steps S1116, S1112, i.e., the login information is transmitted from PC 102, the determination result and the address may be stored in transmission history storage 621 of PC 102.

Further, upon determination in step S1111 that the transmission is normal one (YES in step S1111), the attribute of the text data transmitted is identified by text attribute determining unit 207 (step S1113). In the case where text attribute determining unit 207 identifies some attribute (YES in step S1113), the information indicating the identified attribute is stored in text attribute storage 2032, and the transmitted text data corresponding to the leading page of the text is stored in leading page storage 2031 (step S1114). The identified attribute is related to the transmission history stored in transmission history storage 621 in step S1112 (step S1115).

Thus, the series of processes is ended.

Upon execution of the address setting auxiliary process in MFP 101 according to this embodiment and upon determination that a plurality of addresses are input as destinations of the text data, address group candidates including the input address are extracted from a predetermined search range and the desired address group is selected from the candidates. In this way, an address other than the input address included in the address group is also set as a destination of the text data. As a result, the operation error such as the erroneous setting of the destination, the setting failure or the extraneous address setting is prevented, and a plurality of addresses are accurately set as destinations. Also, the addresses other than those input by the operation of selecting the desired address group from the candidates are set as destinations, and therefore the work load of the user setting a plurality of addresses is reduced.

Figure 8:
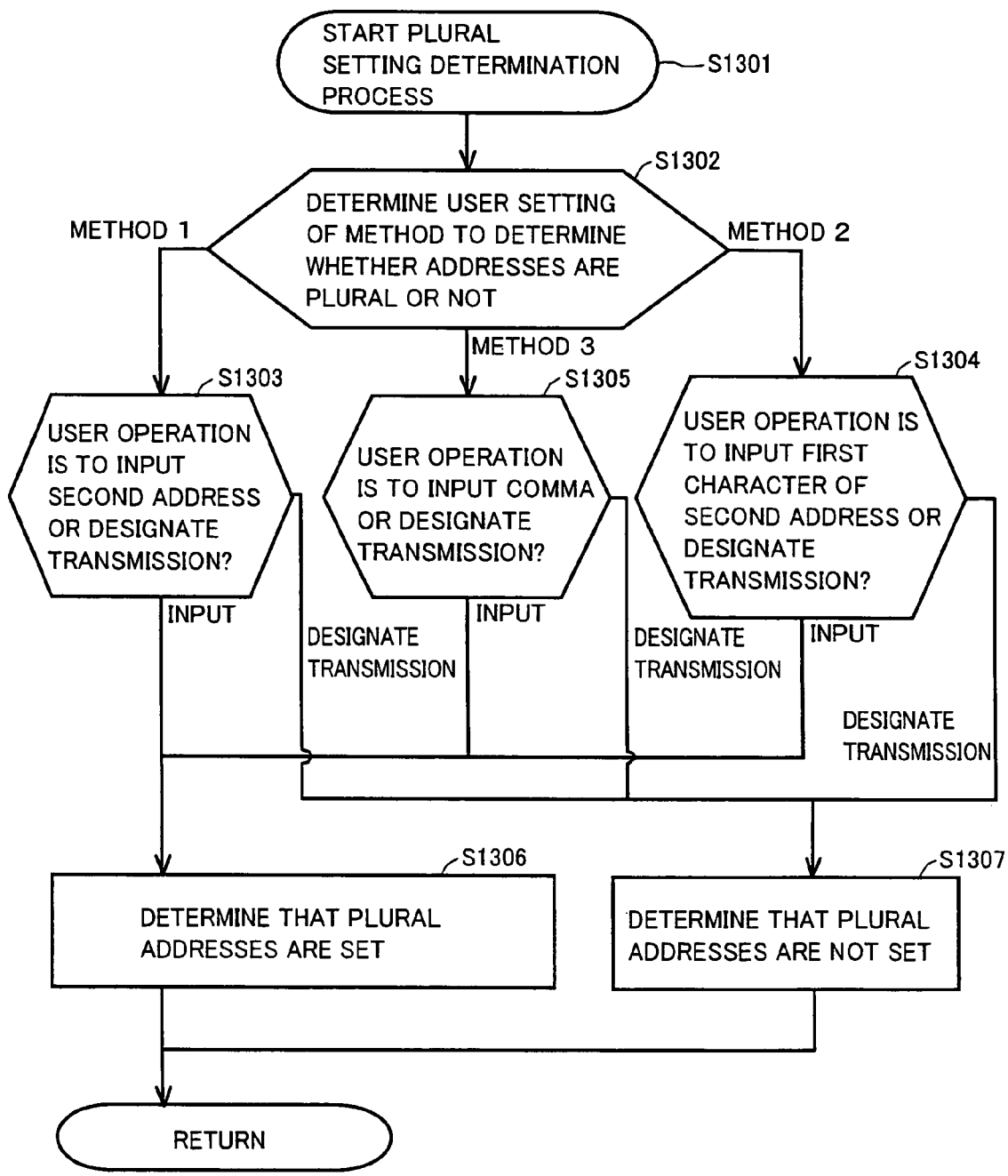
FIG. 8 is a flowchart showing an example of a plural setting determination process in step S1103.

Referring to FIG. 8, upon receipt of an address by address input unit 202 in step S1102, the process is started (step S1301) and CPU 10 determines which of the methods is set by the user for determination by address determining unit 206 (step S1302).

In the case where method 1 is employed ("method 1" in step S1302) and the second address is input ("input" in step S1303), it is determined that a plurality of addresses are included (step S1306). In the case where the text data transmission is designated by the user before inputting the second address ("designate transmission" in step S1303), it is determined that a plurality of addresses are not included (step S1307).

In the case where method 2 is employed ("method 2" in step S1302) and the first character of the second address is input ("input" in step S1304), on the other hand, it is determined that a plurality of addresses are included (step S1306). In the case where the user designates the text data transmission before the first character of the second address is input ("designate transmission" in step S1304), it is determined that a plurality of addresses are not included (step S1307).

In the case where method 3 described is employed ("method 3" in step S1302) and a comma defining the first and second addresses is input after the first address is input ("input" in step S1305), it is determined that a plurality of addresses are included (step S1306). In the case where the user designates the text data transmission before the comma is input ("designate transmission" in step S1305), it is determined that a plurality of addresses are not included (step S1307).

Now, the plural setting determination process of step S1103 is over, and the process proceeds to step S1104.

In the embodiment described above, one of methods 1 to 3 is employed to determine whether a plurality of addresses are set or not. Nevertheless, other methods can be employed for the determination. In the case where broadcast addresses can be set as described later, for example, a method can be employed to determine whether a plurality of addresses are set or not in the case where the first broadcast address is input, in the case where the first character of the first broadcast address is input, in the case where the cursor is moved to a set CC address display unit to input a broadcast address or in the case where the user otherwise shows the intention to input a broadcast address. Also in such a case, a similar process is executed.

FIG. 9 is a diagram showing an example of screen transfer for setting an address to which the user transmits the text data. This shows a specific example of screen transfer in the case where address determining unit 206 determines by method 3 in step S1103 whether a plurality of addresses are set or not, i.e., address determining unit 206 determines that a plurality of addresses are set when a comma is input after the first address. Address setting screens 1201 to 1206 shown in FIGS. 9A to 9F include at least an address setting button 121 to set an address, a data transmission button 122 to designate the text data transmission and a set address display 123 to display a set address, which are displayed on panel 25 of MFP 101 or display 605 of PC 102 having executed an application to transmit the text data from MFP 101.

Upon starting the text data transmission process including the address setting auxiliary process by the log-in operation in step S1101, the address setting screen is displayed.

Upon depression of address setting button 121, the address book is displayed, so that the user can select an address of the destination of the text data from the address book. The address thus selected is displayed on set address display 123. Under this condition, data transmission button 122 is depressed, and the text data is transmitted to the address displayed on set address display 123.

Figure 9A:
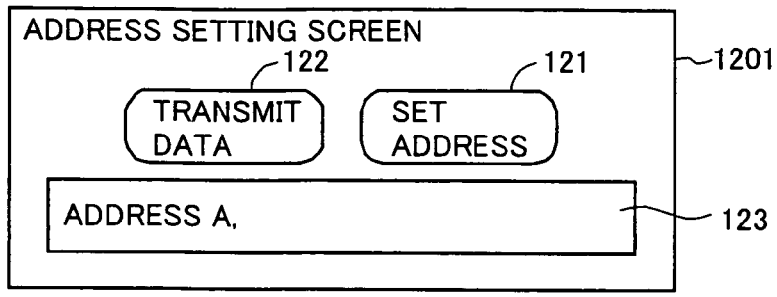
FIGS. 9A to 9F, 10A to 10C, 13A to 13D and 15A to 15B are diagrams showing examples of screen transfer.

In order to set a plurality of addresses as destinations of the text data on the address setting screen, a comma "," is inserted after inputting the first address, i.e., "address A" to set address display 123 (address setting screen 1201 in FIG. 9A). Then, in step S1103, address determining unit 206 determines that a plurality of addresses are set.

Figure 9B:
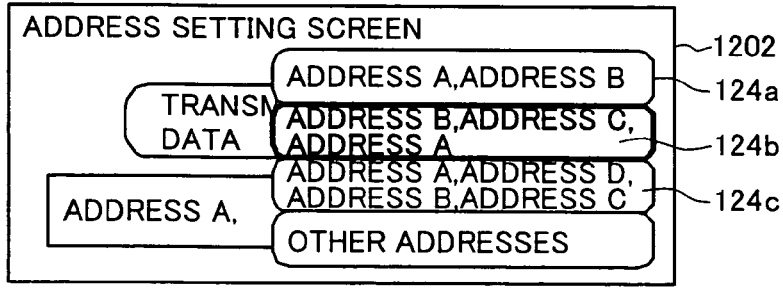

Upon determination that a plurality of addresses are set (YES in step S1104), the address group including address A is searched by address search unit 208 in step S1105, and selectable buttons 124a to 124c corresponding to the extracted address group candidates are displayed in step S1107 (address setting screen 1202 in FIG. 9B). In the process, the address groups extracted as candidates sufficiently include "address A", and as indicated by button 124b, even an address group lacking "address A" at the head thereof is extracted as a candidate.

Figure 9C:
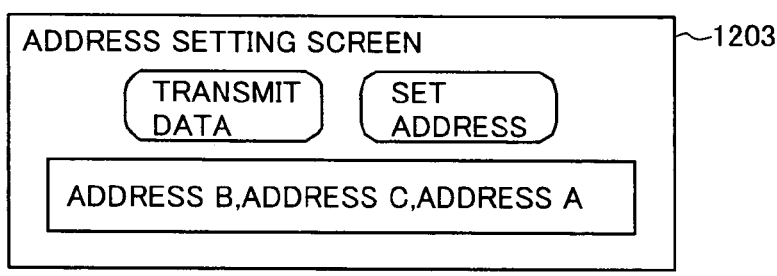
Figure 9D:
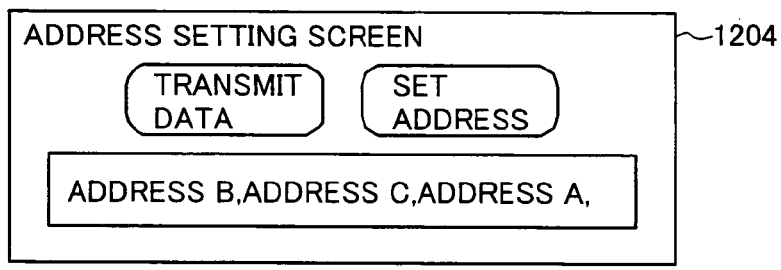
Figure 9E:
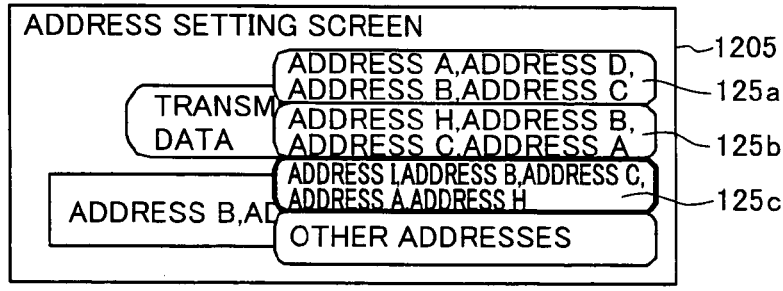

Once one address group consisting of "address B, address C and address A" is selected on address setting screen 1202, each address making up the selected address group is set as a destination of the text data, so that address B, address C and address A making up the particular address group are displayed on set address display 123 (address setting screen 1203 in FIG. 9C).

In the case where a comma "," is inserted in step S1108 to input another address following address B, address C and address A displayed in input column 123 of address setting screen 1203 (address setting screen 1204 in FIG. 9D), address determining unit 206 determines in step S1109 that another address is added. Then, address search unit 208 searches for an address group including currently selected address B, address C and address A in step S1105. Thus, selectable buttons 125a to 125c corresponding to the address group candidates extracted in step S1107 are displayed (address setting screen 1205 in FIG. 9E). In the process, the address groups extracted as candidates sufficiently include "address B", "address C" and "address A", and as indicated by button 125a, even an address group including addresses in other order than "address B", "address C" and "address A" is also extracted as a candidate.

Figure 9F:
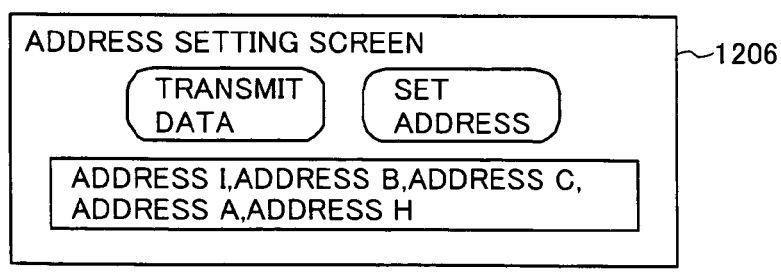

One address group consisting of "address B", "address C" and "address A", once selected on address setting screen 1205, is set as a destination of the text (address setting screen 1206 in FIG. 9F).

Figure 10A:
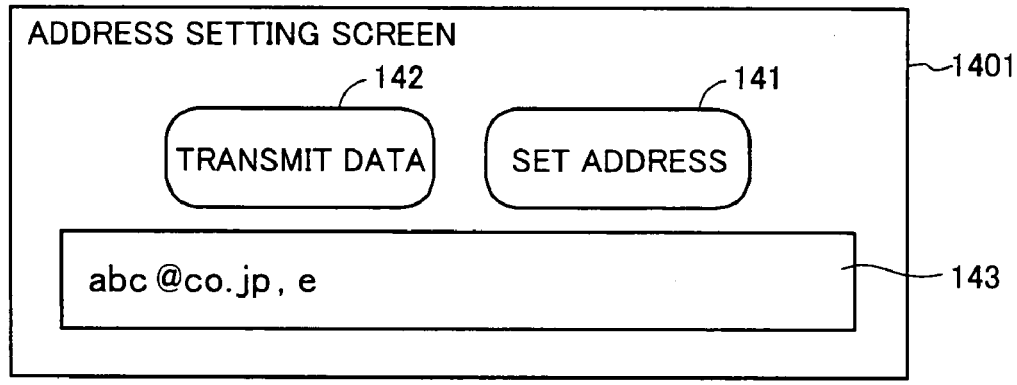
Figure 10B:
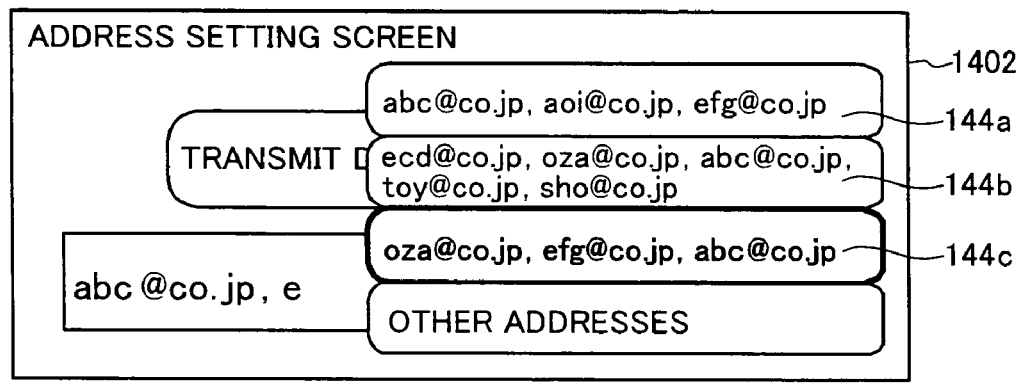
Figure 10C:
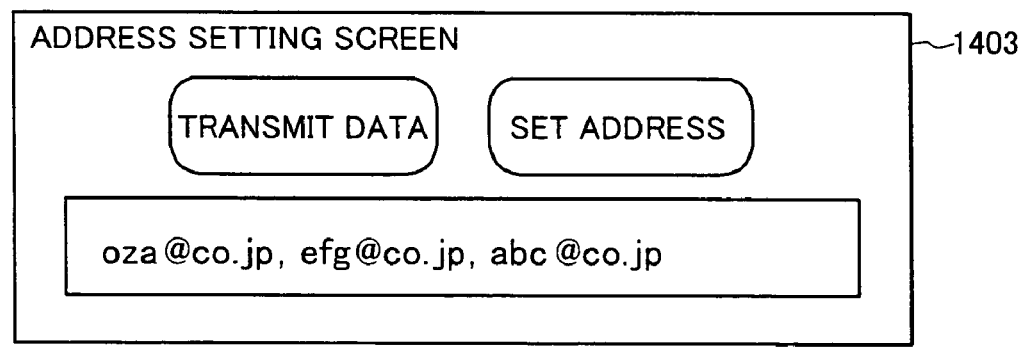

FIG. 10 is a diagram showing an example of screen transfer for setting an address to which the user transmits the text data. This represents a specific example of screen transfer in which address determining unit 206 determines in step S1103 that a plurality of addresses are set by employing method 2, i.e., that a plurality of addresses are set when the first character of the second address is input after the first address. Address setting screens 1401 to 1403 shown in FIGS. 10A to 10C are displayed on panel 25 of MFP 101 or display 605 of PC 102 executing an application to transmit the text data from MFP 101, and include at least an address setting button 141, a data transmission button 142 and a set address display 143.

In the case where the first character "e" of the second address is input after the first address "abc@co.jp" on set address display 123 as a destination of the text data on address setting screen (address setting screen 1401 in FIG. 10A), address determining unit 206 determines in step S1103 that a plurality of addresses are set.

Upon determination that a plurality of addresses are set (YES in step S1104), address search unit 208 retrieves an address group including the first address "abc@co.jp" and an address having "e" as the first character in step S1105, and selectable buttons 144a to 144c corresponding to the extracted address group candidates are displayed in step S1107 (address setting screen 1402 in FIG. 10B). Also in this case, the address group extracted as a candidate sufficiently includes the address "abc@co.jp" and an address having "e" as the first character, and as shown by button 144c, even an address group including address "abc@co.jp" and the address having "e" as the first character not in that order is also extracted as a candidate.

Once an address group consisting of "oza@co.jp", "ef@co.jp, abc@co.jp" is selected on address setting screen 1402, the address group thus selected is set as a destination of the text in the order of registration (address setting screen 1403 in FIG. 10C).

According to this embodiment, this plural setting determination process is executed by MFP 101 to determine that a plurality of addresses are set in the stage at which the user inputs the second address or in the stage at which the user shows the intention to input the second address (i.e., the state at which the first character of the second address is input, or in the stage at which a comma is input after the input of the first address to input the second address). As a result, the address setting auxiliary process is started early after the user starts operation. Thus, the address group candidates can be displayed in early stage of the user operation, thereby making it possible to reduce the address setting work load of the user.

Figure 11:
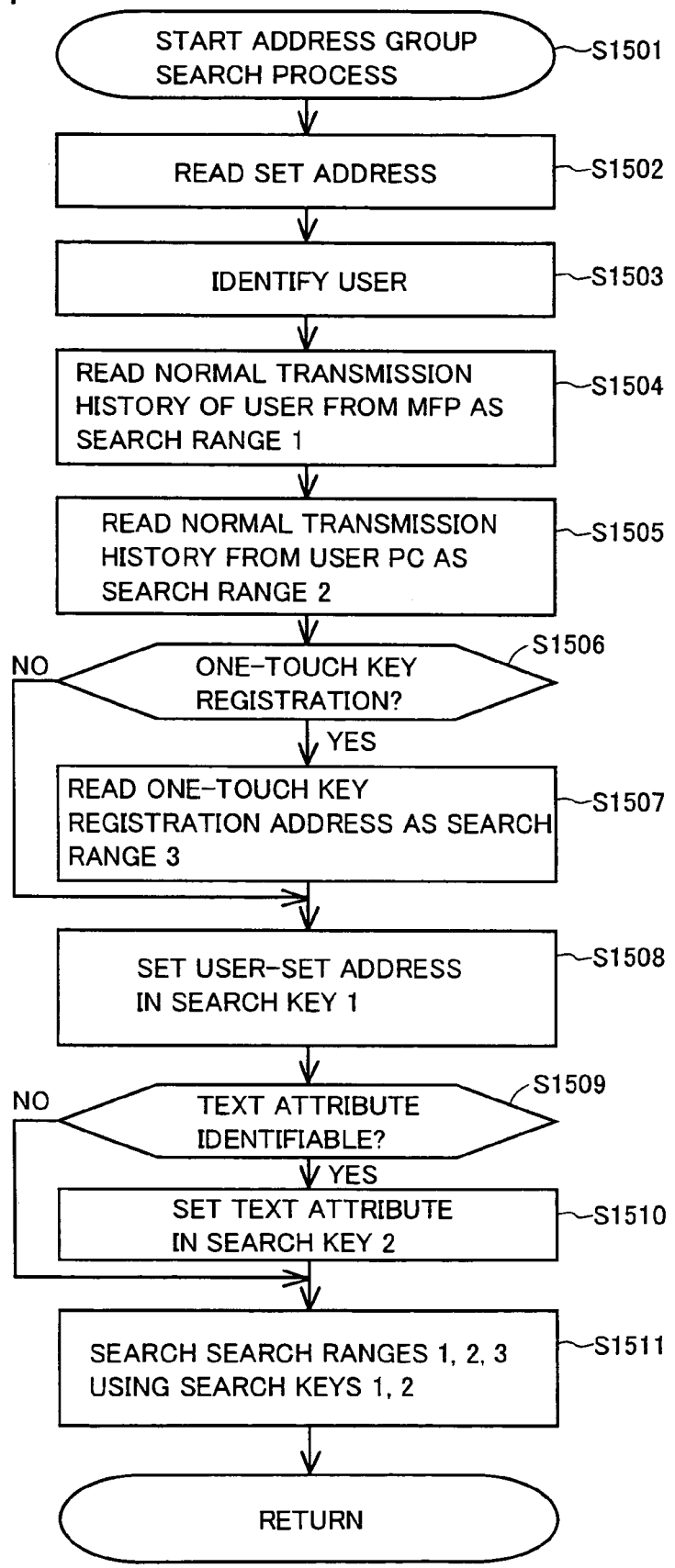
FIG. 11 is a flowchart showing an example of an address group search process in step S1105.

Referring to FIG. 11, the process is started in the case where the plural setting determination process in step S1103 shows that a plurality of addresses are set (step S1501), and address search unit 208 reads the address input by address input unit 202 (step S1502).

Then, the information to identify the user who has logged in or the group (department or section) associated with the user are acquired from user identifier 205 (step S1503), and the transmitting party reads the transmission history of normal transmission result from transmission history storage 204 of MFP 101 and sets search range 1 with regard to the particular user (or the group associated with the user) (step S1504).

Then, from the identification information acquired in step S1053, PC 102 related to the user (or the group associated with the user) is accessed, and the transmission history of normal transmission result is read from transmission history storage 621 of PC 102 and set as search range 2 (step S1505).

In the case where an address corresponding to a one-touch key is registered in a one-touch key registration unit 200 (YES in step S1506), the address thus registered is read and defined as a search range 3 (step S1507).

Next, the address read in step S1502 and set by the user is defined as a search key 1 (step S1508).

Then, in the case where the attribute of the text data transmitted can be identified by text attribute determining unit 207 (YES in step S1509), the text attribute identified by the text attribute determining unit 207 is acquired and defined as a search key 2 (step S1510). Search key 2 is not limited to the text attribute identified by text attribute determining unit 207 and may include the text attribute related to the identified text attribute.

Search ranges 1, 2, 3 are searched using search keys 1, 2, and a corresponding address group is extracted (step S1511). In the case where a plurality of addresses input are used as search key 1, an address group including the particular plurality of addresses is extracted without regard to the order of input thereof in step S1511.

The address group search process in step S1105 is now ended, and in accordance with the search result, the process proceeds to step S1107 or S1108.

In the above-mentioned example, search keys 1, 2 are used for search ranges 1, 2, 3. As an alternative, one or two of search ranges 1, 2, 3 may be searched. Also, search ranges 1, 2, 3 may be set in that order of priority and in the case where an address group is not extracted from a search range of high priority order, the search range of the next high priority order may be searched. Further, a range other than the specific examples described above may be set as a search range. This is also the case with search keys 1, 2.

According to this embodiment, the aforementioned address group search process is executed by MFP 101, and address group candidates are extracted from a range which the user is likely to set as a destination such as the transmission history or the one-touch key registration based on the login information. Therefore, address group candidates highly likely to be selected can be displayed. Also, in view of the fact that the search is executed using, as a search key, the address input or the attribute of the text data transmitted, the address group candidates highly likely to be selected are displayed. As a result, the address setting work load of the user is reduced.

Figure 12:
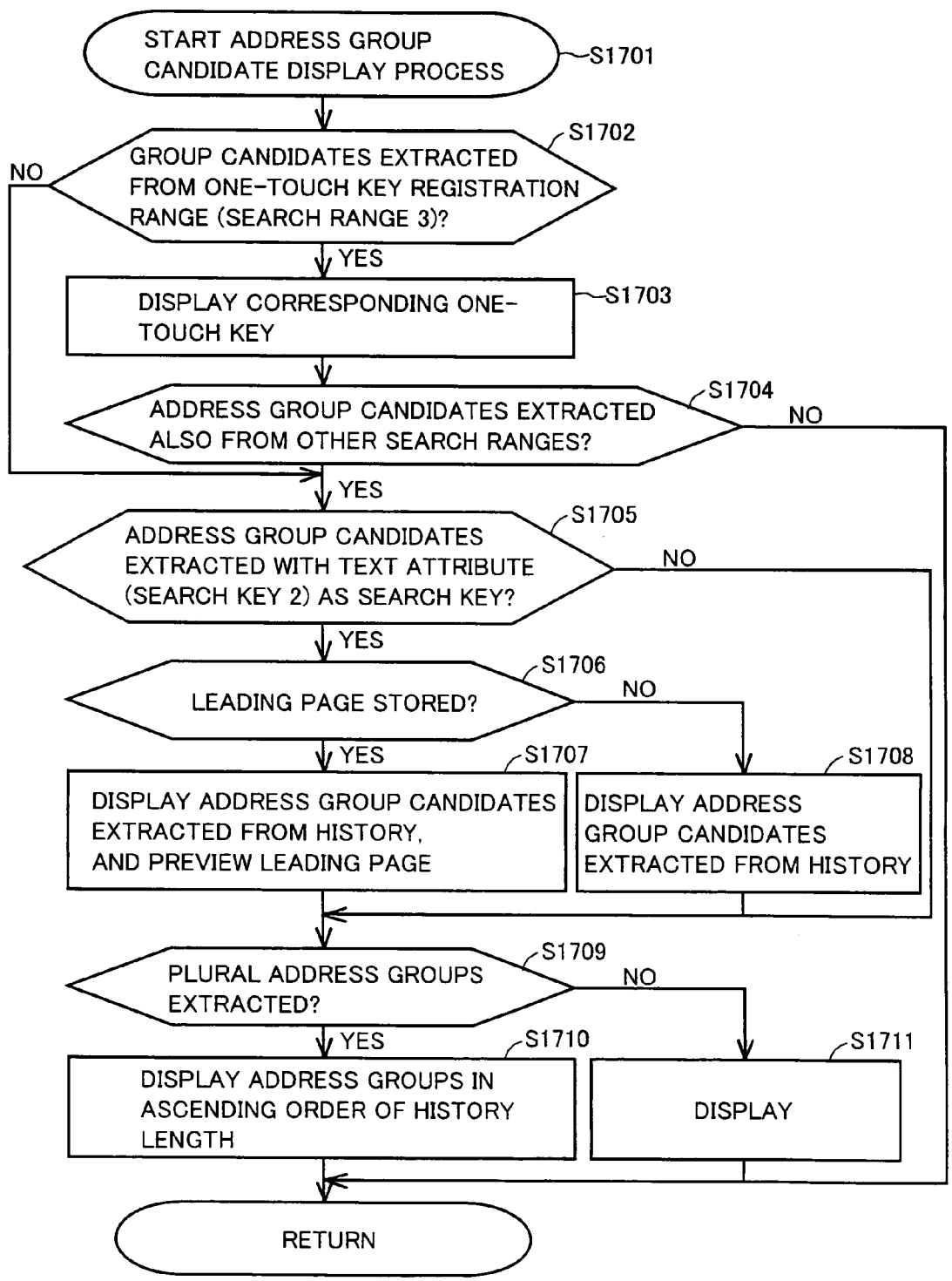
FIG. 12 is a flowchart showing an example of an address group candidate display process in step S1107.

Referring to FIG. 12, the process is started in the case where the corresponding address group candidates are extracted as the result of address group search in step S1105 (step S1701).

In the case where an address group candidate is extracted from the addresses registered in one-touch registration unit 200 by the address group search process in step S1105, i.e., in the case where some address group candidate is extracted from search range 3 (YES in step S1702), address proposition unit 209 executes the process in which the one-touch key corresponding to the particular address group candidate in one-touch key registration unit 200 is displayed on panel 25 of MFP 101 or display 605 of PC 102 which has executed an application to transmit the text data from MFP 101 (step S1703).

Further, in the case where an address group candidate is extracted also from other search ranges, i.e., in the case where some address group candidate is extracted from search range 2 (transmission history storage 204 of MFP 101) and/or search range 3 (transmission history storage 621 of PC 102) (YES in step S1704), assume that the address group candidate corresponds to the transmission history extracted with the text attribute of the transmitted text data as a search key (search key 2) (YES in step S1705) and the leading page corresponding to the particular transmission history is stored in a leading page storage 2031 (YES in step 1706). Then, address proposition unit 209 executes the process in which the preview of the address group corresponding to the extracted transmission history and the leading page corresponding to the particular transmission history is displayed on panel 25 of MFP 101 or display 605 of PC 102 which has executed an application to transmit the text data from MFP 101 (step S1707). In the case where no leading page corresponds to the transmission history (NO in step S1706), on the other hand, address proposition unit 209 executes the process in which the address group corresponding to the extracted transmission history is displayed on panel 25 of MFP 101 or display 605 of PC 102 that has executed an application to transmit the text data from MFP 101 (step S1708).

In the case where only one address group is extracted from search range 2 and/or search range 3 by the address group search process of step S1105 (NO in step S1709), address proposition unit 209 executes the process in which the extracted address group is displayed on panel 25 of MFP 101 or display 605 of PC 102 that has executed an application to transmit the text data from MFP 101 (step S1711). In the case where a plurality of address groups are extracted (YES in step S1709), on the other hand, the address groups thus extracted are rearranged in the ascending order of length of the transmission history, so that the process is executed to display the address groups sequentially from the one with the latest transmission history on panel 25 of MFP 101 or display 605 of PC 102 that has executed an application to transmit the text data from MFP 101 (step S1710).

In this way, the address group candidate display process in step S1107 is ended, and the process stands by waiting for the designation from the user in step S1108.

FIG. 13 shows an example of the screen transfer for setting an address to which the user transmits the text data. Specifically, FIG. 13 is a diagram showing a specific example of the screen transfer in the case where a plurality of address group candidates are extracted from the one-touch key registration range (search range 3) and transmission history storage 204 of MFP 101 (search range 2) or transmission history storage 621 of PC 102 (search range 3) in the address group search process of step S1105. Address setting screens 1601 to 1604 shown in FIGS. 13A to 13D, which are displayed on panel 25 of MFP 101 or display 605 of PC 102 that has executed an application to transmit the text data from MFP 101, include at least an address setting button 161, a data transmission button 162 and a set address display 163.

Figure 13A:
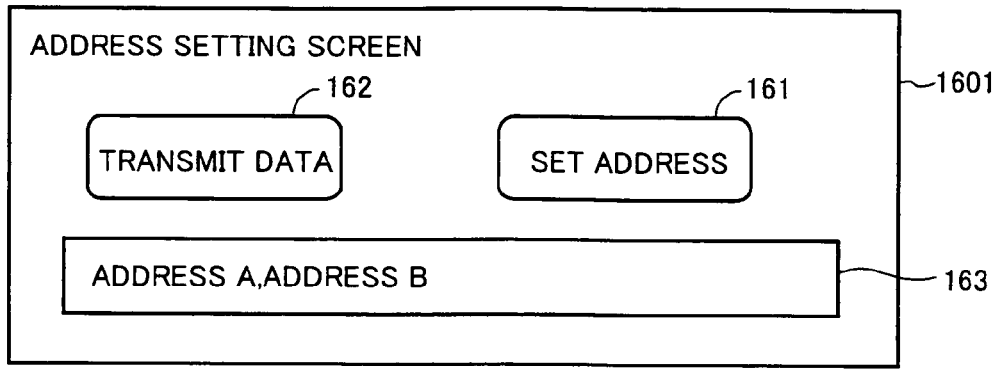

In the case where address determining unit 206 determines by method 1 in step S1103 whether a plurality of addresses are set, i.e., address determining unit 206 determines that a plurality of addresses are set when the second address is input following the first address, assume that the second address, i.e., "address B" is input following the first address, i.e., "address A" to set address display 163 (address setting screen 1601 in FIG. 13A). Address determining unit 206 determines in step S1103 that a plurality of addresses are set and the address group search process is executed in step S1105.

As the result of the address group search process in step S1105, assume that address group candidates including address A and address B are extracted from the addresses (search range 1) registered in one-touch key registration unit 200 (YES in step S1702). In step S1703, selectable buttons 164*a* to 164*c* corresponding to one-touch keys 1 to 3 associated with the address group candidates are displayed on the address setting screen (address setting screen 1602 in FIG. 13B).

The user can perform any of the operations of selecting the one-touch key with the desired address group registered therein from buttons 164a to 164c displayed on address setting screen 1602, adding an address from the address book, etc. without selecting any of buttons 164a to 164c (without selecting any of one-touch keys 1 to 3) and depressing data transmission button 162 under this condition to designate the transmission of the text data.

Further, assume that as the result of the address group search process in step S1105, an address group candidate including address A and address B is extracted from the transmission history storage 204 (search range 2) of MFP 101 and/or the transmission history storage 621 (search range 3) of PC 102 (YES in step S1705) and the leading page corresponding to the transmission history is stored in leading page storage 2031 (YES in step S1706). Then, in step S1707, selectable buttons 165a to 165c corresponding to the address groups associated with the transmission history are displayed on the address setting screen together with the preview of the leading pages (texts 1 to 3) corresponding to the particular transmission history (address setting screen 1603 in FIG. 13C).

Figure 13B:
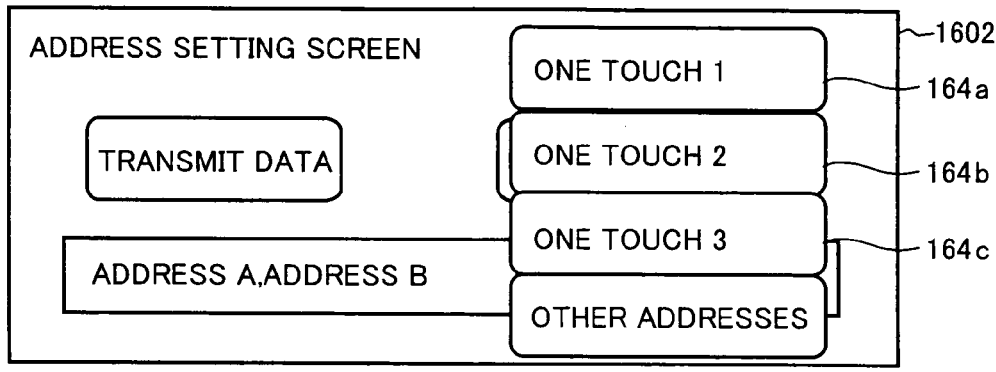
Figure 13C:
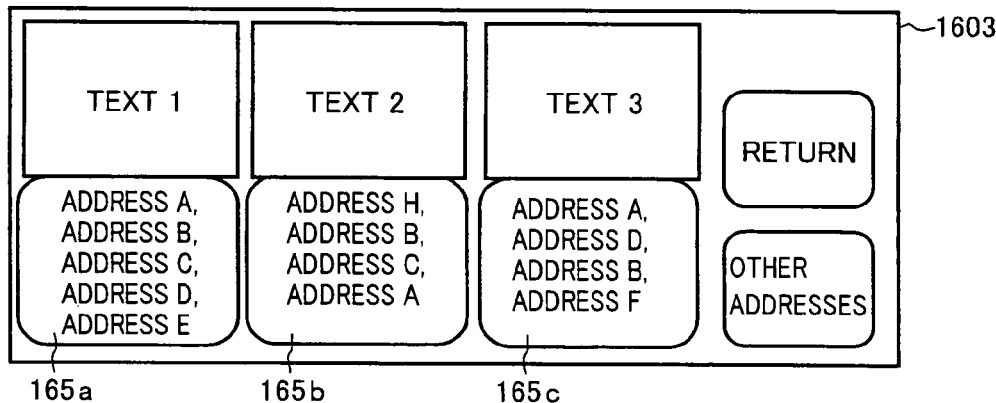
Figure 13D:
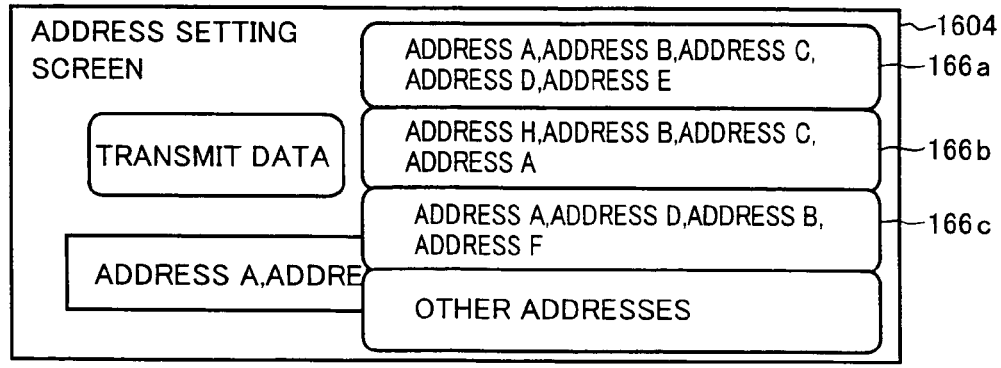

The user, by reference to the text on the leading pages displayed on address setting screen 1603, can perform any of the operations of selecting the desired address group from buttons 165a to 165c, adding an address from the address book, etc. without selecting any of buttons 165a to 165c, and returning to address setting screen in FIG. 13B using the "return" button.

Further, as the result of the address group search process in step S1105, assume that a plurality of address group candidates including address A and address B are extracted from search range 2 and/or search range 3 (YES in step S1709). The address group candidates are rearranged in the ascending order of the length of the transmission history in step S1710, and selectable buttons 166a to 166c corresponding to the address groups associated with each transmission history are displayed sequentially from that of the latest transmission history on the address setting screen (address setting screen 1604 in FIG. 13D).

The user can perform any of the operations of selecting the desired address group from buttons 166a to 166c corresponding to the address group candidates displayed in the ascending order of length of the transmission history on address setting screen 1604, adding an address from the address book, etc. without selecting any of buttons 166a to 166c, and designating the transmission of the text data by clicking data transmission button 162 under this condition.

Address setting screen 1602 may be transferred to address setting screen 1603, or address setting screen 1603 to address setting screen 1604 automatically after the lapse of a predetermined time. Alternatively, as shown on address setting screen 1603 in FIG. 13C, the screen may be transferred by the user operating the "return" button or the "advance" button displayed.

According to this embodiment, this address group candidate display process is executed by MFP 101, so that the address group candidates are displayed in the descending order of the possibility of being set by the user as a destination. Also, a part of the text data transmitted to an address group in the past is displayed together with the particular address group candidate. As a result, the address setting work load of the user is reduced.

In the case where texts are transmitted between offices, destinations are often set top down along the job hierarchy of the addresses (president, department manager, section manager, and so on). In addition to setting a plurality of addresses, therefore, the order in which the particular addresses are set is required to be taken into consideration, thereby imposing a heavy burden on the user. According to this embodiment, the process of displaying the address group candidates is executed by MFP 101. In selecting and setting the desired address as a destination from the address group candidates extracted, the addresses are set in the same order as in the previous transmission (in the order indicated by the history). Thus, the user can start the input operation with any address hit upon or easy to input, thereby reducing the burden on the user.

Figure 14:
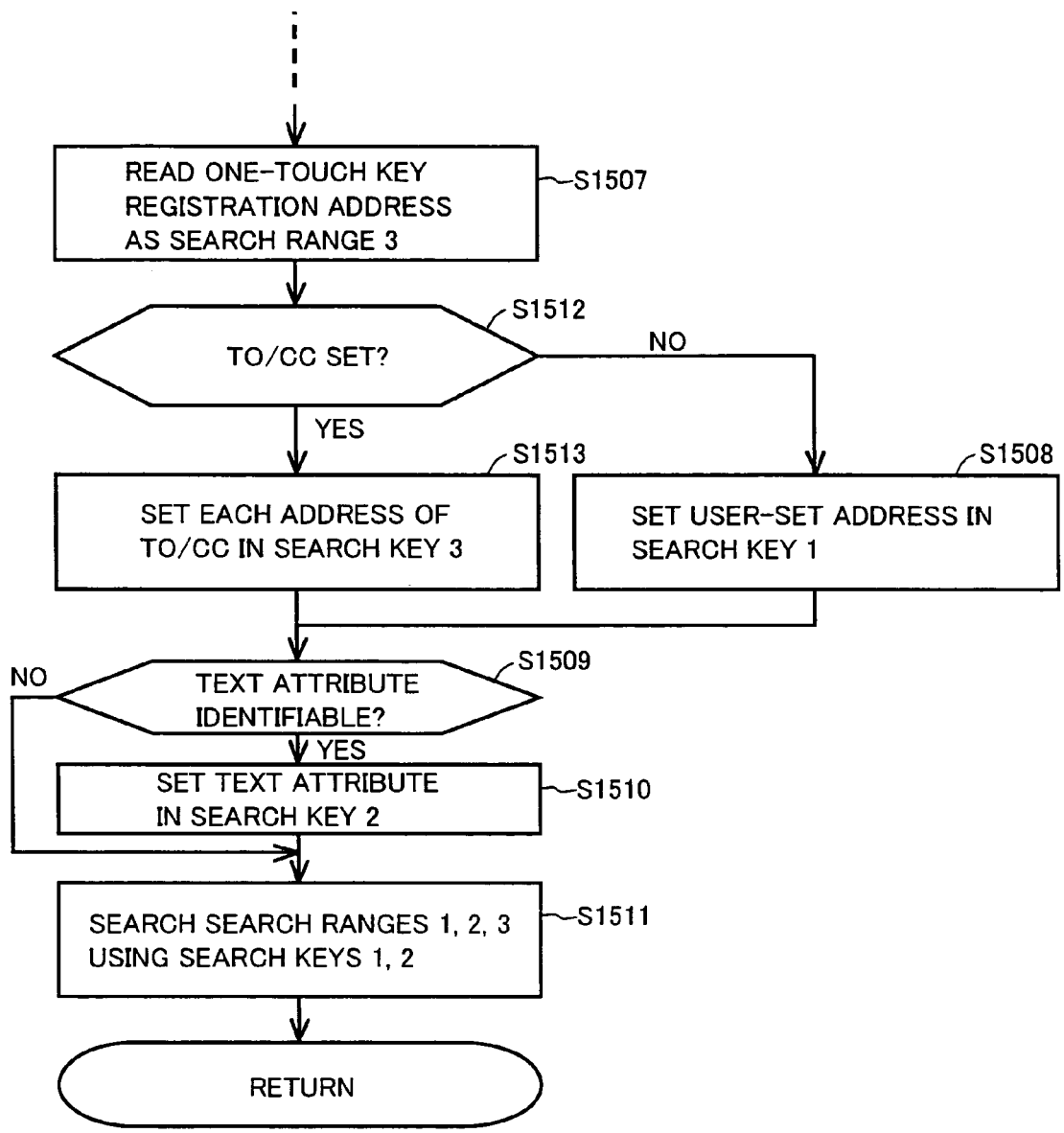
FIG. 14 is a flowchart showing a modification of the address group search process in step S1105.

Referring to FIG. 14, once steps S1501 to S1507 in FIG. 11 are executed and search ranges 1 to 3 set, address determining unit 206 determines whether a broadcast address is set as the address read in step S1502 and set by the user (step S1512). In the case where the broadcast address is set (YES in step S1512), the address and the broadcast address set by the user are defined as search key 2 (step S1513). In the case where no broadcast address is set, i.e., in the case where only a TO address is set (NO in step S1512), on the other hand, the address read in step S1502 and set by the user is defined as search key 1 (step S1508).

Subsequently, a similar process to the one shown in FIG. 11 is executed.

Figure 15A:
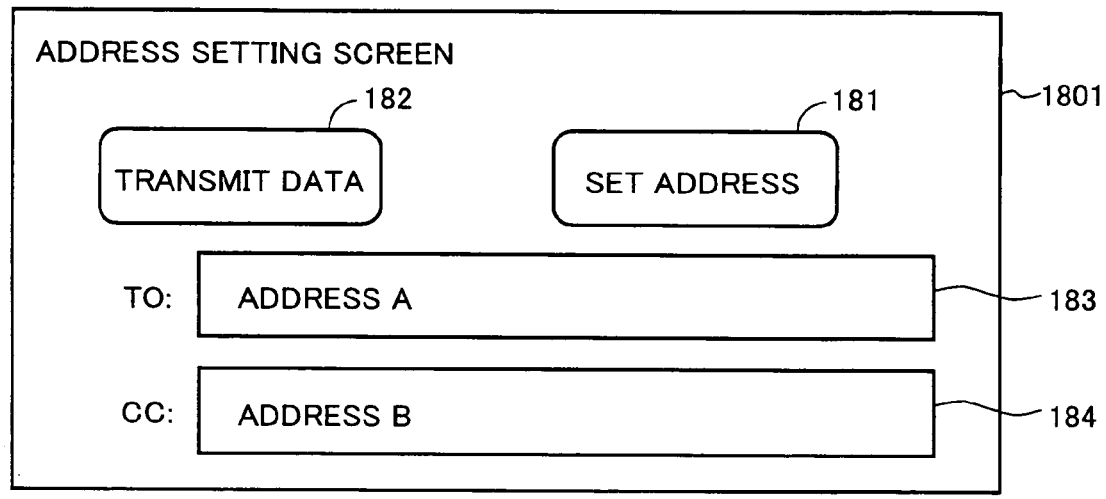
Figure 15B:
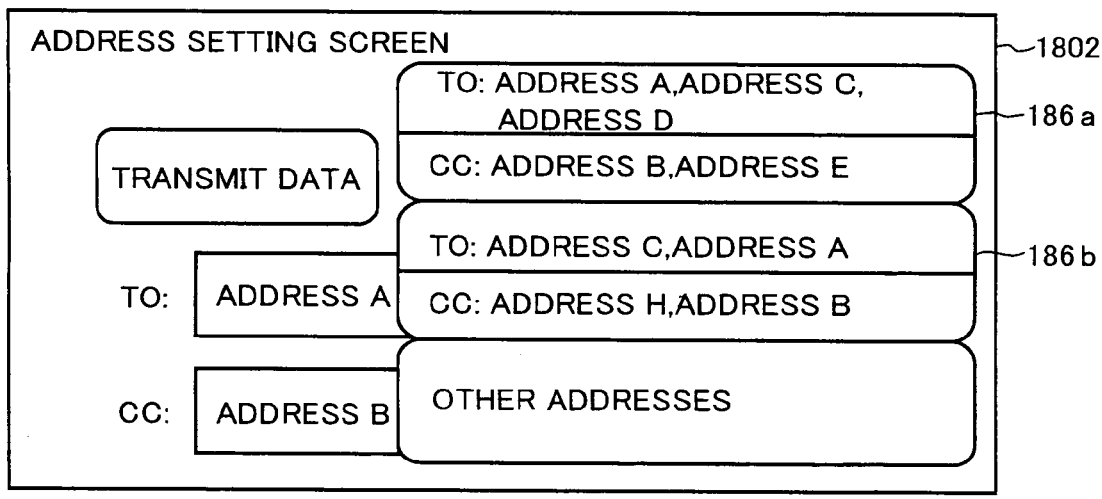

FIG. 15 is a diagram showing an example of screen transfer for setting an address to which the user transmits the text data. This shows a specific example of screen transfer for executing the address group search process and extracting the destination group candidates according to the above-mentioned modification. Address setting screens 1801, 1802 shown in FIGS. 15A, 15B are displayed on panel 25 of MFP 101 or display 605 of PC 102 having executed an application to transmit the text data from MFP 101, and include at least an address setting button 181, a data transmission button 182, and a set TO address display unit 183 and a set CC address display 183.

In the address setting screen, the first address, i.e., "address A" is input to set TO address display 183 as a destination of the text data, and the first broadcast address, i.e., "address B" is input to set CC address display 183 (address setting screen 1801 in FIG. 15A). Then, address determining unit 206 determines in step S1103 that a plurality of addresses are set.

At the same time, in step S1513, address A making up TO address and address B making up CC address are set in search key 3, and in step S1511, search range 2 (transmission history storage 204 of MFP 101) and/or search range 3 (transmission history storage 621 of PC 102) are searched to extract an address group candidate including address A as TO address and address B as CC address. In step S1107, selectable buttons 186a, 186b corresponding to the address group candidates are displayed selectably (address setting screen 1802 in FIG. 15B).

The user can perform any of the operations of selecting the desired address group from buttons 186a, 186b displayed on address setting screen 1802, adding an address from the address book, etc. without selecting any of buttons 186a, 186b and depressing data transmission button 182 under this condition to designate the transmission of the text data.

According to a modification of this embodiment, the address group search process is executed by MFP 101, and an address group candidate which the user is highly likely to set as a destination is extracted. As a result, the address setting work load on the user is further reduced.

According to the embodiments described above, the MFP is shown as an example of a data transmission device. Nevertheless, the present invention may be implemented by the data transmission device other than MFP. A facsimile, a scanner or a printer having the network function, for example, also can realize the data transmission device according to the present invention.

Also, according to the embodiments described above, the text data are used as data to be transmitted. The data transmission device according to the present invention, however, can transmit any data including the text data. The image data, voice data, mail data, and the file data attached to the mail data, for example, can be transmitted by the data transmission device according to the present invention. The data transmission device according to the present invention, therefore, can be implemented as a device capable of transmitting other than the text data. A personal computer or a PDA (Personal Digital Assistants), mobile phone, and a portable communication terminal having the network function, for example, can also realize the data transmission device according to the present invention.

Further, the address setting auxiliary method executed in the data transmission device can be provided as an address setting auxiliary program.

In these embodiments, a method is illustrated to assist the user in setting an address for transmission of text data by executing the address setting auxiliary program. By executing the address setting auxiliary program according to this invention, however, the user can be assisted in setting an address to transmit any data including the text data. For example, the user can be assisted in setting an address to transmit the image data, voice data, mail data or a file attached to the mail data by executing the address setting auxiliary program according to the present invention.

The address setting auxiliary program can be provided also as a program product by being recorded in a computer-readable recording medium such as a flexible disk, CD-ROM, ROM or RAM attached to the computer. As an alternative, the address setting auxiliary program can be provided by being recorded in a recording medium such as a hard disk built in the computer. As another alternative, the address setting auxiliary program can be provided by being downloaded through a network. Also, it may be provided by being built in other programs such as a mail transmitting/receiving program.

The program product thus provided is executed by being installed in a program storage such as a hard disc. The program product includes the program itself and a recording medium for recording the program.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data transmission device comprising:
   an address input unit to input a destination of transmission data as an address;
   an address determining unit to determine whether a plurality of addresses are input as destinations by said address input unit;
   an address search unit to, upon determination by said address determining unit that a plurality of addresses are input as destinations by said address input unit, search a transmission history including said destinations input by said address input unit, and acquire an address group including said addresses as destinations; and
   a proposition unit to propose said address group acquired by said address search unit.

2. The data transmission device according to claim 1, further comprising:
   a user identifier to identify a user inputting said address, wherein
   said address search unit searches said transmission history including said user identified by said user identifier.

3. The data transmission device according to claim 2, further comprising:
   an access unit to access another device, wherein
   said address search unit searches said transmission history transmitted by said user and stored in said other device accessed by said access unit.

4. The data transmission device according to claim 1, further comprising:
   an attribute determining unit to determine the attribute of said transmission data, wherein
   said transmission history includes the attribute of the data transmitted, and
   said address search unit searches said transmission history related to said attribute of said transmission data determined by said attribute determining unit.

5. The data transmission device according to claim 1, wherein
   said transmission history includes the transmission result, and
   said address search unit searches said transmission history of which said transmission result is that of normal transmission.

6. The data transmission device according to claim 1, wherein
   said transmission history includes information for time of transmission, and
   upon acquisition of a plurality of address groups by said search unit, said proposition unit proposes said plurality of address groups in the order based on said information for time of transmission in said transmission history with each of said plurality of address groups as destinations.

7. The data transmission device according to claim 1, wherein
   said transmission history includes at least a part of the data transmitted, and
   said proposition unit proposes at least a part of said transmitted data included in said transmission history with said address group as a destination, together with said address groups acquired by said address search unit.

8. The data transmission device according to claim 1, wherein
   said transmission history includes a broadcast address as said destination, and
   when a broadcast address is included in said destination of said transmission data input by said address input unit, said address search unit further acquires said address group providing said destination in said transmission history including said broadcast address as said destination.

9. The data transmission device according to claim 1, further comprising:
   a one-touch key registration unit to store a predetermined address group as related to a key, wherein
   said address search unit searches said one-touch key registration unit and acquires said address group related to said key including said plurality of addresses.

10. The data transmission device according to claim 9, wherein said proposition unit proposes said key related to said address group as said address group acquired by said address search unit.

11. A computer-readable medium having an address setting auxiliary program stored thereon that causes a computer to execute a process of assisting in setting an address of transmission data, the program causing the computer to execute operations comprising:

inputting an address as a destination of said transmission data;

determining whether a plurality of addresses are input as destinations in said address inputting operation;

searching, upon determination in said address determining operation that a plurality of addresses are input as destinations in said address inputting operation, a transmission history including said destinations input in said address inputting operation, and acquiring an address group including said addresses as destinations; and proposing said address group acquired in said address searching operation.

12. The computer-readable medium according to claim 11, wherein the program further causes the computer to perform an operation of:

identifying a user inputting said address, wherein said address searching operation comprises searching the transmission history including said user identified in said user identifying operation.

13. The computer-readable medium according to claim 12, wherein the program further causes the computer to perform an operation of:

accessing another device, wherein said address searching operation comprises searching said transmission history transmitted by said user and stored in said other device accessed in said accessing operation.

14. The computer-readable medium according to claim 11, wherein the program further causes the computer to perform an operation of:

determining the attribute of said transmission data, wherein said transmission history includes the attribute of the data transmitted, and said address searching operation comprises searching said transmission history related to said attribute of said transmission data determined in said attribute determining operation.

15. The computer-readable medium according to claim 11, wherein said transmission history includes a transmission result, and said address searching operation comprises searching said transmission history of which said transmission result is that of normal transmission.

16. The computer-readable medium according to claim 11, wherein said transmission history includes information for time of transmission, and when a plurality of address groups are acquired in said address searching operation, said proposing operation comprises proposing said plurality of address groups in order based on said information for time of transmission in said transmission history with each of said plurality of address groups as destinations.

17. The computer-readable medium according to claim 11, wherein said transmission history includes at least a part of the transmitted data, and said proposing operation comprises proposing at least a part of said transmitted data included in said transmission history with said address group as a destination, together with said address group acquired in said address searching operation.

18. The computer-readable medium according to claim 11, wherein said transmission history includes a broadcast address as said destination, and when said destination of said transmission data input in said address inputting operation includes a broadcast address, said address searching operation comprises further acquiring said address group providing said destination in said transmission history including said broadcast address as a destination.

19. The computer-readable medium according to claim 11, wherein said computer includes a one-touch registration unit to store a predetermined address group as related to a key, and said address searching operation comprises searching said one-touch key registration unit, and acquiring said address group related to said key including said plurality of addresses.

20. The computer-readable medium according to claim 19, wherein said proposing operation comprises proposing said key related to said address group as said address group acquired in said address searching operation.

* * * * *

UNITED STATES PATENT AND TRADEMARK OFFICE
CERTIFICATE OF CORRECTION

PATENT NO.       : 7,623,514 B2                                    Page 1 of 1
APPLICATION NO.  : 11/178338
DATED            : November 24, 2009
INVENTOR(S)      : Ozawa et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1139 days.

Signed and Sealed this

Twenty-sixth Day of October, 2010

David J. Kappos
*Director of the United States Patent and Trademark Office*